United States Patent [19]

Russell et al.

[11] Patent Number: 5,208,108

[45] Date of Patent: May 4, 1993

[54] HELICAL FOAM PACKING PEANUT

[75] Inventors: Patrick M. Russell, Freeland; Dale G. Petrini, Midland, both of Mich.

[73] Assignee: The Dow Chemical Company, Midland, Mich.

[21] Appl. No.: 855,171

[22] Filed: Mar. 20, 1992

[51] Int. Cl.⁵ ............................................. B32B 3/30
[52] U.S. Cl. ................................ 428/398; 428/397; 428/371; 428/399; 206/584; 206/814; D9/456
[58] Field of Search ................ 428/98, 371, 397, 399, 428/398; 206/584, 814; D9/456

[56] References Cited

U.S. PATENT DOCUMENTS

| D. 254,123 | 2/1980 | Bussey, Jr. | D9/294 |
|---|---|---|---|
| D. 255,661 | 7/1980 | Atkins | D9/294 |
| D. 258,267 | 2/1981 | Atkins | D9/456 |
| D. 274,312 | 6/1984 | Witte | D9/456 |
| D. 279,170 | 6/1985 | Witte | D9/456 |
| D. 281,308 | 11/1985 | Bussey, Jr. | D9/456 |
| 3,251,728 | 5/1966 | Humbert et al. | 161/168 |
| 3,410,933 | 11/1968 | Moseley, Jr. | 264/51 |
| 3,613,162 | 10/1971 | Talsma | 18/14 |
| 3,829,269 | 8/1974 | Smith | 425/308 |
| 4,042,658 | 8/1977 | Collins | 264/45.5 |
| 4,073,842 | 2/1978 | Smith | 264/53 |
| 4,169,179 | 9/1979 | Bussey, Jr. | 428/159 |
| 4,867,667 | 9/1989 | Moriyama | 425/190 |
| 4,960,554 | 10/1990 | Bambrick | 264/219 |

Primary Examiner—Alexander S. Thomas
Attorney, Agent, or Firm—J. Robert Dean, Jr.

[57] ABSTRACT

Disclosed is an extruded plastic suitable for expansion to a foam packing peanut and a process for making the pellet and the peanut. The peanut comprises a discrete plastic body having a core portion extending continuously along the longitudinal extension of the body and an outer portion extending from and continuously along the core portion along the longitudinal extension. The body further has a blowing agent incorporated therein. In a preferred embodiment, the pellet takes on a generally helical shape. Also disclosed is a foam packing peanut formed by expansion of the pellet described above. Further disclosed is a package useful in transporting, storing, or cushioning an article or articles comprising a receptacle containing the article and a plurality of the foam peanut described above. The peanuts are capable of providing a packing factor of 3.0 or greater.

12 Claims, 1 Drawing Sheet

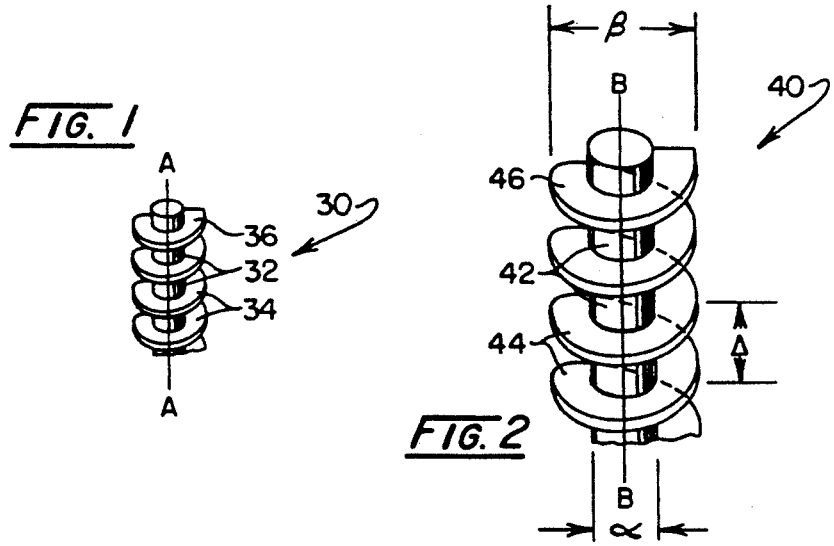
FIG. 1
FIG. 2
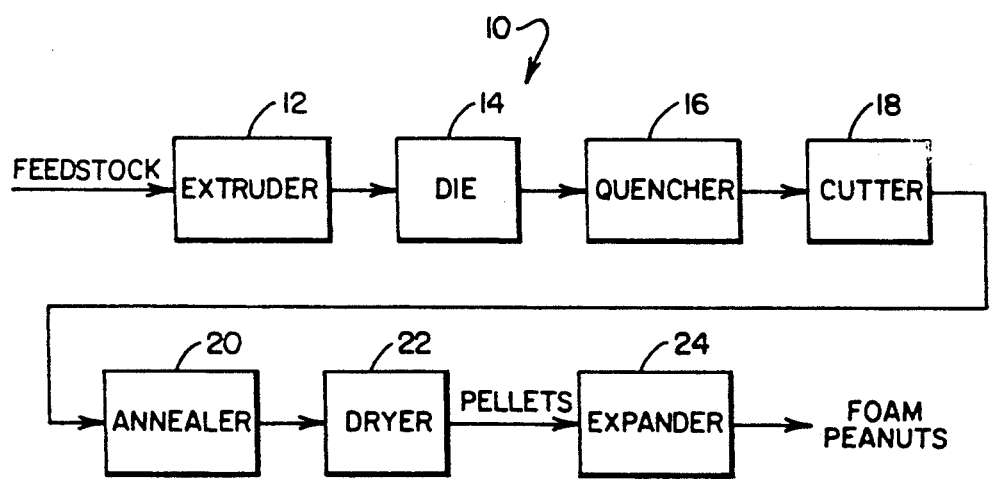
FIG. 3
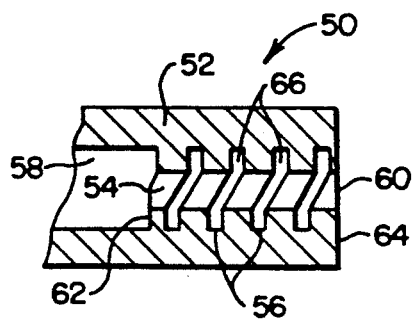
FIG. 4

HELICAL FOAM PACKING PEANUT

BACKGROUND OF THE INVENTION

This invention relates to a novel foam packing peanut providing enhanced packing and the extruded plastic pellet from which the packing peanut is formed. The invention also relates to a method for making the foam packing peanut and the plastic pellets from which it is formed.

Lightweight low density materials have commonly been used as packing materials. Such materials commonly include foamed plastics, wood, and paperboard. Such materials are commonly utilized in the form of small, discrete bodies for reasons of handling, convenience, even distribution, and enhanced cushioning.

A problem with presently available packing peanuts is that they pack too densely requiring that relatively large numbers of them be utilized to occlude a given volume. It would be desirable to have a packing peanut having a shape which packs less densely.

One way of decreasing packing density is to use foam peanuts which are curled or discontinuous in shape along their axis of extrusion or longitudinal extension. Such foam peanuts are seen in U.S. Pat. Nos. 3,251,728; 3,829,269; and 4,073,842. The drawback in using such foam peanuts is that they are difficult to manufacture. The relatively small, foamable plastic pellets from which they are expanded have a tendency to relax and lose the desired curled or discontinuous shape during processing of the pellets.

It would be desirable to have an expandable or foamable plastic pellets which are discontinuous in shape along their axis of extrusion or longitudinal extension, and would maintain their shape during the processing and expansion.

SUMMARY OF THE INVENTION

According to the present invention, there is an extruded plastic pellet suitable for expansion into a foam packing peanut. The peanut comprises a discrete plastic body having a core portion extending substantially along the longitudinal extension of the body and an outer portion extending from and continuously along the core portion along the longitudinal extension. The outer portion is discontinuous in shape in cross-section transverse to the axis of extrusion along the longitudinal extension. The plastic pellet has a blowing agent incorporated therein. The plastic pellet retains its shape during processing, and expands to form a foam peanut offering lower packing density than commercially-available foam peanuts.

According to the present invention, there is a package useful in transporting or storing an article comprising a receptacle capable of receiving and containing the article wherein the receptacle has a plurality of the foam peanut described above therein. Preferably, the plurality of peanuts are capable of providing a packing factor of 3.0 or greater and more preferably of about 4.5 to about 5.0. The packing factor is defined as the density of the foam peanuts divided by the apparent density of the foam peanuts. The apparent density is the weight of the peanuts occluding a given volume divided by that volume. Packing factor is measured according to military specification PPTC-1683A.

BRIEF DESCRIPTION OF THE INVENTION

The novel features of the present invention and the context within they are set will be better understood upon reviewing the following specification together with the drawings.

FIG. 1 shows a fragmentary, perspective view of an embodiment of a foamable plastic pellet according to the present invention with an axis of extrusion along line A—A;

FIG. 2 shows a fragmentary, perspective view of the foamed packing peanut of the present invention made according to the present invention by expansion of the plastic pellet of FIG. 1: the present having an axis of extrusion along line B—B; and FIG. 3 shows a schematic view of the process for making foamable plastic pellets and foam peanuts according to the present invention.

FIG. 4 shows a cross-section view of a die suitable for use in the process of FIG. 3.

DETAILED DESCRIPTION OF THE INVENTION

An extruded plastic pellet suitable for expansion into a foam packing peanut is generally referenced by the numeral 30, and is shown in FIG. 1. The corresponding foam packing peanut formed by the expansion of pellet 30 is generally referenced by the numeral 40, and is shown in FIG. 2.

Pellet 30 comprises a discrete plastic body 36 having a core portion 32 and an outer portion 34. Core portion 32 extends substantially along the axis of extrusion or longitudinal extension of the body as represented by line A—A, and is preferably substantially straight. Outer portion 34 extends from core portion 32 and continuously along core portion 32 along line A—A. Outer portion 34 is discontinuous in shape and cross-section along line A—A. The term "cross-section" refers to cross-sections transverse to or perpendicular with line A—A.

Outer portion 34 preferably extends from core portion 32 to give pellet 30 a generally helical or corkscrew shape. The helix may be right-hand or left-hand. The shape of core portion 32 is not critical, but is preferably generally cylindrical.

Pellet 30 offers considerable advantages over pellets presently known in the art. One advantage is a substantial decrease in packing density of corresponding expanded foam peanuts compared to those of commercially-available pellets. Another advantage is maintenance of the desired shape of the foam peanut upon processing and expansion of the pellet compared to known helical-shaped foam peanuts.

Foam peanut 40 formed by the expansion of pellet 30 is much larger dimensionally than pellet 30, but is substantially similar or the same in shape and configuration. Though not illustrated by the relative sizes of pellet 30 in FIG. 1 and foam peanut 40 in FIG. 2, actual foam peanuts are typically about 30 times greater in length and about 22 times greater in width than their corresponding expandable pellets. Peanut 40 is comprised of a discrete plastic body 46 having a core portion 42 and an outer portion 44. Core portion 42 extends substantially along the axis of extrusion or longitudinal extension of peanut 40 as represented by line B—B, and is preferably substantially straight for reasons of appearance. Outer portion 44 extends from core portion 42 and continuously along core portion 42 along line B—B.

Outer portion 44 is discontinuous in shape in cross-section along line B—B. The term "cross-section" refers to cross-sections transverse to or perpendicular with line B—B. The diameter or thickness of the core portion of peanut 40 is shown in FIG. 2 as $a$, the diameter of the flute as $\Delta$, and the pitch is $\Delta$.

The overall shape of the present peanut is more readily attained than that of known curl- or twist-shaped foam peanuts because the shape of the pellet from which the present foam peanut is formed retains its shape during processing to a more substantial degree than those pellets corresponding to the known peanuts. Such known peanuts are exemplified in U.S. Pat. Nos. 3,251,728: 3,829,269; and 4,073,842; which are incorporated herein by reference. Pellets corresponding to known curl- or twist-shaped peanuts exhibit a tendency to come unraveled during their processing or manufacture, particularly during the annealing step. The present pellet addresses the problem of unraveling by providing a core portion. The core portion prevents unraveling of the pellet because of the resistance it provides to such a motion. For the present pellet to unravel, the core portion must wind up: since the core portion resists being wound up, the pellet is resistant to unraveling. The core portion should comprise a sufficient portion of pellet by weight to prevent the pellet from unraveling. Preferably, the core portion will comprise at least 3% and preferably at least 50% of the pellet by weight. Further preferably, if the pellet takes a helical form, the thickness or diameter of the core portion is at least twice that of the dimension of the flute, which is the width of the outer portion or helix transverse to the longitudinal extension of the pellet.

While the helical shape of the present pellet and foam peanut is preferred, they may take other shapes as long as the body comprising same has a configuration in accordance with the present invention. The body of the pellet or peanut has a core portion extending along the axis of extrusion or longitudinal extension of the body. The body further has an outer portion extending from and continuously along the core portion along the axis of extrusion or longitudinal extension. The outer portion is discontinuous in shape in cross-section transverse to the axis of extrusion or longitudinal extension. The discontinuity of the outer portion in cross-section and continuity along the core portion imparts to the foam peanut an overall shape which allows it to pack less densely than peanuts with outer portions which are not discontinuous in cross-section and not continuous along the core portion.

Plastic materials suitable for the expandable or foamable pellets and the foam peanuts of the present invention include any known foamable thermoplastic or thermoset material. Suitable plastic materials may include blends of two or more plastic materials. Suitable plastic materials include polystyrene, polyolefins such as polyethylene and polypropylene, polyamides, polycarbonates, polyurethanes, and polyisocyanurates. Suitable plastic materials may be homopolymers or copolymers of monoethylenically unsaturated comonomers. Particularly preferred plastics are styrenic polymers such as polystyrene and its derivatives. Such derivatives include alphamethylstyrene, butylstyrene, divinyl benzene, and bromostyrene. Useful copolymer derivatives include styrene-acrylic acid and the like. Useful polyethylenes include those of high, medium, low, linear low, and ultra-low density types. Also useful are ethylenic copolymers such as ethylene-acrylic acid, ethylene-vinyl acetate, and the like.

The foam may further contain elastomeric components such as polyisobutylene, polybutadiene, ethylene/propylene copolymers, and ethylene/propylene diene interpolymers if desired. Other possible additional components include crosslinking agents if desired. Other additional components may include nucleating agents, extrusion aids, antioxidants, colorants, pigments, etc. if desired.

Suitable blowing agents include gaseous materials, volatile liquids, and chemical agents which decompose into a gas or other byproducts. Suitable blowing agents include, but are not limited to nitrogen, carbon dioxide, air, argon, water, methyl chloride, ethyl chloride, n-butane, isobutane, n-pentane, isopentane, hexane, perfluoromethane, 1,1-difluoroethane, 1,1-dichloro-2,2-difluoroethane, 1,1,1,2-tetrafluoroethane, chloro-trifluoromethane, dichlorodifluoromethane, trichlorofuoromethane, perfluoroethane, 1-chloro-1,1-difluoroethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane, perfluorocyclobutane, azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. The blowing agent may comprise a mixture of two or more blowing agents. A preferred blowing agent is isopentane.

The present closed-cell foam structure preferably is at least 70% and more preferably at least 90% closed-cell according to ASTM D-2856.

The process of the present invention for making foam peanuts is shown schematically in FIG. 3. The process, generally referenced by the numeral 10, comprises in sequence an extruder 12, a die 14, a quencher 16, a cutter 18, an annealer 20, a dryer 22, and an expander 24. The process steps from the extruder to the dryer are normally carried out by the manufacturer of the plastic pellets, and expansion of the plastic pellets in the expander to form foamed peanuts is typically carried out by the end user of the foamed peanuts.

The extruder melts or plasticizes the plastic and mixes various additives, including the blowing agent, under pressure to form a foamable plastic gel, and conveys or delivers the foamable gel through the die to a region of lower pressure than that within the extruder. The blending of various components of the foamable gel may be accomplished according to known techniques in the art such as with an extruder, blender, mixer, or other suitable blending device. The term "feedstock" in FIG. 1 refers to the plastic material, blowing agent and other additives to be processed in the extruder or in blending devices downstream to form the plastic gel. Blowing agent is typically mixed with the plastic at a level of about 0.2 to about 5.0 gram moles per kilogram of plastic.

The die may be any die which forms a continuous plastic body which is discontinuous in cross section, defines an outer portion extending continuously therealong, and has a core portion along its axis of extrusion. Suitable dies include those of a solid substrate defining an orifice therethrough in the form of a twisted or helical-shaped pathway through the solid substrate. As the foamable plastic gel passes through the die, the helical-shaped passageway imparts an analogously-shaped cross section to the flowable gel. A molecular orientation is imparted to the foamable gel in the direction of flow through the die. As a result of this orientation, the gel will maintain the shape of the helical die orifice for a relatively brief period of time after passing though it. While still in a helical shape, the continuous plastic body is cooled in the quencher.

A preferred die is seen in cross-section in FIG. 4, and is referenced by the numeral 50. Die 50 comprises a die body 52. Die body 52 defines a core passageway 54 and grooves 56 defined therethrough and therein. Core passageway 54 extends through die body 52 from die face 62 to die face 64. The shape of passageway 54 is not critical, but is preferably cylindrical. Grooves 56 extend from passageway 54 into die body 52, and extend from face 62 to face 64 in a helical and concentric configuration. Grooves 56 form a unitary or single grooved passageway 66 from face 62 to face 64.

The foamable gel enters die 50 at die face 62, conducts itself through core passageway 54 and grooved passageway 66, and exits through die face 64. Upon exiting die 50, the continuous plastic body, which at this point is in melt or plasticized form, has sufficient melt elasticity to retain the helical configuration imparted to it by die 50 until quenching. The portion of the foamable gel which traverses die 50 through core passageway 54 corresponds to the core portion of the continuous plastic body. Likewise, the portion of the foamable gel which traverses die 50 through grooved passageway 66 corresponds to the outer portion of the continuous plastic body.

The quencher is situated in close proximity to the orifice of the die so that the continuous plastic body is cooled relatively quickly upon exiting the die to solidify the continuous body in a helical configuration and to ensure that no significant degree of foaming takes place within the body. The quencher cools the continuous plastic body to a temperature at or below which the shape or configuration of the continuous body is substantially maintained. For crystalline or semi-crystalline plastic, such a temperature level will preferably be less than the melting point of the polymer. For amorphous plastics such temperature will preferably be lower than the glass transition temperature. For polystyrene, the preferred cooling range is from about 50° C. to about 70° C. Quendhin may be carried out by any means known in the art such as by air cooling or water cooling. The preferred method of quenching is moving or conveying the strand-like, continuous plastic body through a water bath. After quenching, the continuous plastic body is conveyed or delivered to the cutter.

The cutter intermittently severs the continuous plastic body into a multiplicity of discrete plastic bodies or pellets. The cutter may be any means known in the art for cutting such as a knife edge. After the pellets exit the cutter, they are conveyed or delivered to the annealer. The preferred means for conveying or delivering the pellets from the cutter to the annealer is by water slurry.

The annealer heats the plastic pellets, and imbibes them with water. The annealer raises the temperature of the pellets such that water may be more easily imbibed therein. For polystyrene and other amorphous plastics, the temperature of annealing is preferably between the glass transition temperature and the melting point. The annealer provides the pellets with an internal water concentration of preferably between about 1400 and about 1800 and more preferably about 1600 parts water per million parts plastic by weight. The water provides nucleation sites for cellular formation and also acts as a blowing agent when the pellet is expanded. After exiting the annealer, the pellets are conveyed or delivered to the dryer.

The dryer reduces the internal water content of the pellets to a level below which substantial agglomeration of imbibed water might occur. Preferably, the internal water content of the pellets is reduced to between about 400 and about 600 parts water per million parts plastic by weight. Such drying may be carried out by any means known in the art such as by heating or by exposure to an airstream. A preferred means of drying comprises a gravity-fed, packed dryer wherein pellets are fed into the top of the dryer and air is fed into the bottom of the dryer. The air is forced upward through the column and carries water from the pellets out of the dryer in the form of water vapor. After the pellets exit the annealer, they are typically bagged and sold to end users.

The plastic pellets are expanded to form foam peanuts by raising their temperature to a level sufficient to volatilize the blowing agent incorporated therein and to soften the plastic. The temperature of the pellets may be raised by any means known in the art such as exposure to heat or a heat source such as steam or heated air. It is preferred to expose the pellets to steam in order to expand them. The pellets are placed in a steam chest or chamber until the desired degree of expansion is obtained, and then they are removed and allowed to cool and cure. About 24 hours later, the foamed peanut is again exposed to steam and further expanded, and then removed and allowed to cool and cure. Maximum expansion of the pellets into foam peanuts is obtained by expanding them a multiple number of times, preferably about four times.

Though the dimensions of the foam plastic peanut are not critical, typical peanuts are less than 2 inches (in.) (5.1 centimeters (cm)) in length and preferably range in length from about 0.5 in. (1.3 cm) to about 1.0 in. (2.5 cm). The peanuts are typically less than 1.5 in. (3.8 cm) in width and preferably range from about 0.125 in. (0.3 cm) to about 0.25 in. (0.6 cm) in width. Likewise, the pitch or spacing of the threads of the helixes is not critical, but the pitch preferably ranges from about 0.5 in. (1.3 cm) to about 1.0 in. (2.5 cm).

The packing density of the present foam peanut may be further enhanced by utilizing mixtures of a plurality of peanuts having two or more different pitch sizes. Using peanuts with two or more different pitch sizes reduces packing density, and, thus, increases packing factor versus peanuts having the same pitch size.

While embodiments of the plastic pellet and the process for making same have been shown with regard to specific details, it will be appreciated that depending upon the manufacturing process and the manufacturer's desires the present invention may be modified by various changes while still being fairly within the scope of the novel teachings and principles herein set forth.

What is claimed is:

1. An extruded, foamable plastic pellet suitable for expansion into a foam peanut, comprising: a discrete plastic body, the body having (a) a core portion extending substantially along the longitudinal extension of the body, and (b) an outer portion extending from and continuously along the core portion along the longitudinal extension, the outer portion being discontinuous in shape in cross-section transverse to the longitudinal extension along the longitudinal extension, the discrete body having incorporated therein a blowing agent.

2. The pellet of claim 1, wherein the core portion is substantially straight.

3. The pellet of claim 1, wherein the core portion of the body is generally cylindrical in cross-section transverse to the longitudinal extension along the longitudinal extension.

4. The pellet of claim 1, wherein the body is generally helical in shape.

5. The pellet of claim 1, wherein the blowing agent is water and a volatile blowing agent other than water.

6. The pellet of claim 1, wherein the plastic body is comprised of polystyrene.

7. The peanut of claim 6, wherein the peanut has a length of up to 5.1 centimeters along the longitudinal extension.

8. The package of claim 7, wherein the peanuts are capable of providing a packing factor of 3.0 or greater.

9. The package of claim 7, wherein the peanuts are capable of providing a packing factor of about 4.5 to about 5.0.

10. The package of claim 7, wherein the plurality of foam packing peanuts comprises peanuts having two or more different pitch sizes.

11. A package useful in transporting or storing an article, comprising: a receptacle capable of receiving and containing the article, the receptacle having a plurality of the foam packing peanut of claim 6 therein.

12. A foam packing peanut formed by expansion of the pellet of claim 1.

* * * * *

UNITED STATES PATENT AND TRADEMARK OFFICE
CERTIFICATE OF CORRECTION

PATENT NO. : 5,208,108

DATED : May 4, 1993

INVENTOR(S) : Patrick M. Russell and Dale G. Petrini

It is certified that error appears in the above-identified patent and that said Letters Patent is hereby corrected as shown below:

In Claim 7, delete "7", and insert -8-; further, delete "6", and insert -7-.

In Claim 8, delete "8", and insert -10-; further, delete "7", and insert -9-.

In Claim 9, delete "9", and insert -11-; further, delete "7", and insert -8-.

In Claim 10, delete "10", and insert -12-; further, delete "7", and insert -8-.

In Claim 11, delete "11", and insert -9-; further, delete "6", and insert -7-.

In Claim 12, delete "12", and insert -7-.

Signed and Sealed this

Twenty-second Day of February, 1994

Attest:

BRUCE LEHMAN

*Attesting Officer*  *Commissioner of Patents and Trademarks*